W. N. LURCOTT.
MACHINE FOR MAKING GROMMETS.
APPLICATION FILED OCT. 19, 1920.
1,432,767.
Patented Oct. 24, 1922.
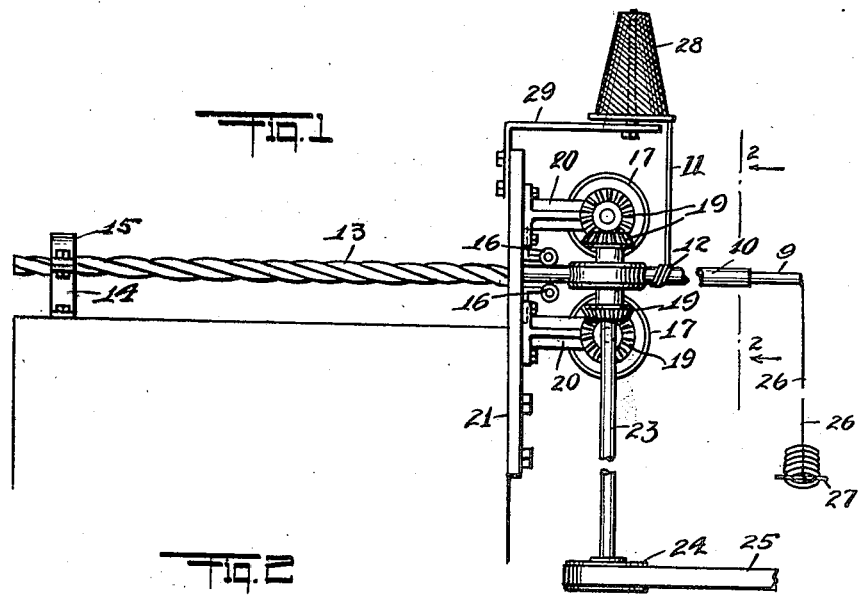
INVENTOR
WINFRED N. LURCOTT
BY
ATTORNEY Patented Oct. 24, 1922.

1,432,767

UNITED STATES PATENT OFFICE.

WINFRED N. LURCOTT, OF WEEHAWKEN, NEW JERSEY, ASSIGNOR TO WILLIAM A. YOUNG GASKET CORPORATION, OF NEW YORK, N. Y.

MACHINE FOR MAKING GROMMETS.

Application filed October 19, 1920. Serial No. 418,044.

*To all whom it may concern:*

Be it known that I, WINFRED N. LURCOTT, a citizen of the United States, and a resident of Weehawken, in the county of Hudson and State of New Jersey, have invented certain new and useful Improvements in Machines for Making Grommets, of which the following is a full, clear and exact description.

Among the principal objects which the present invention has in view are: To mechanically construct grommets of the character as disclosed in application for patent filed by William A. Young, Serial No. 300,568, date of filing, May 29, 1919, entitled, "Method of manufacturing grommets," to which application cross reference is here made; to shorten the time required for the manufacture of these grommets; to simplify the manual operation in the manufacture of grommets of the character mentioned; and to simplify the mechanism required for performing the various functions.

Drawings:

Figure 1 is a side view of a machine constructed and arranged in accordance with the present invention.

Figure 2 is a face view on enlarged scale of the machine partly in section, the section being taken as on the line 2—2 in Fig. 1.

Figure 3 is a detail view, diagrammatically arranged for showing the method of operation of the machine.

Figure 4 is a side view of a grommet produced by the machine.

Description:

As disclosed in the prior application, to which cross reference is above made, the grommet is constructed from fiber material, generally known as "wicking," and is formed by first disposing the wicking to form a ring of several strands loosely disposed, and then rolling the ring upon its annular axis for wrapping the continuation of the wicking about the ring in spiral arrangement, the product finally produced being a ring having a soft core about which a spiral wrapping is bound.

These grommets are generally formed to fit bolts of standard size and are used in commerce as gaskets to prevent leakage about the bolt opening. With this end in view and the further object of preserving the grommet, the grommet is dipped in, or otherwise saturated with lead pigment or other packing or calking material. In service the grommet is slipped over the bolt prior to placing the washer in position to receive the nut which is finally screwed on to the bolt.

The machine by which these grommets are made employs a mandrel 9. The mandrel 9 is covered with a rubber jacket 10 on which the strand 11 of the wicking is coiled to form the core as is shown best in Figures 1 and 3 of the drawings.

Rigidly secured to the end of the mandrel 9 is a twisted bar 13, the forward end of which rests in a nut formed by the standard 14 and cap 15 fitting the same. The mandrel is supported by rollers 16 which hold the mandrel and bar in position as the same are thrust and drawn between the rolling pulleys 17. Resulting from the twist in the bar 13, the mandrel 9 is rotated on its own center during the movement of the mandrel between the pulleys 17.

The pulleys 17 as shown in the drawings are preferably four in number. The faces of the pulleys are grooved to a curve concentric with the mandrel 9 and jacket 10 thereof. The surfaces of the pulleys 17 are held from contact with the jacket 10, as seen best in Fig. 2 of the drawings. All pulleys 17 are fixedly mounted on the short shafts 18 on which also are rigidly mounted miter gears 19.

The shafts 18 are mounted in bearings formed in the standards 20, which are bolted securely to a face plate 21, in which a perforation 22 is formed for the passage of the mandrel 9 and jacket 10.

One of the pulleys 17 is supported by a driven shaft 23, to which power is transmitted by the pulley 24 and belt 25. Any form of transmission for driving the shaft 23, may be employed.

The miter gears 19 are meshed to secure simultaneous operation of all of the pulleys. It will be noted that the pulleys are driven by reason of the meshing of the gears 19 at the inner side of the rectangular grouping of said pulleys in the same rotary direction relative to the mandrel 9. The movement of the peripheries of the pulleys 17 adjacent the mandrel 9 is in the direction opposed to the travel or movement of the mandrel 9. The immediate result of this arrangement is that the core 12 is engaged by the pulleys 17 at the outer perimeter of the ring formed by the said core, while the inner surface of the ring is engaged by the mandrel 9 and jacket 10 thereof. The simultaneous operation of the opposing forces results as far as the core and ring is concerned in rolling the ring, the location of which remains the same throughout the operation of the machine.

The length of the jacket 10 varies and occurs with the design to make a thick or thin grommet. Usually, the mandrel 9 and the bar 13 are constructed of such a length that when the mandrel is pressed forward, its full length, the bar 13 and the mandrel therefor, is rotated on its center, two complete revolutions. When so revolved, it will be understood the ring or core 12 receives two complete wrappings of the strand 11. If one wrapping is desired, the jacket 10 is shortened, or a short jacket is used. If more than two wrappings are required, an elongated mandrel and bar therefor, as well as, an elongated jacket, are employed. This rarely, however, is desired.

As seen best in Fig. 1 of the drawings, the mandrel 9 has secured at the extremity thereof, a string, at the lower end of which is a cross bar 27 forming a swing on which the grommets are collected as formed by the machine. It will be understood that as each grommet is completed, the operator clips the strand 11 at the end close to the completed grommet and rolls the completed grommet over the end of the mandrel 9 allowing it to fall over the string 26, while the loose end of the strand is again wrapped on the mandrel to form the ring or core 12, when the application is resumed. When a required number of grommets is delivered to the string 26 this is removed from the mandrel 9 and tied so that the group or bunch of grommets are accurately measured and securely held.

The strand 11 is usually delivered from a cop 28 which is held in a bracket 29 secured to the upper edge of the face plate 21.

Claims:

1. A machine as characterized comprising, a reciprocating mandrel adapted for holding coiled fiber strand; a plurality of rotative members grouped about said mandrel, for engaging said coiled strand; and means for rotating said members for rotating the coiled strand on said mandrel when the same is projected between said members.

2. A machine as characterized comprising, a mandrel adapted for frictionally engaging a coiled fiber strand ring formed therein; and means surrounding said mandrel for frictionally engaging said coiled strand, the outer perimeter thereof, for rolling the same on said mandrel when the said mandrel and said means are moved in relatively opposite directions.

3. A machine as characterized comprising, a reciprocating mandrel for supporting a ring formed by wrapping the unsevered extremity of a fiber strand on said mandrel; means for mechanically rotating said mandrel as the same is manually moved lengthwise; and means embodying a plurality of circuitously driven members grouped about said mandrel in adjacent relation thereto, the movement of the surface of said members adjacent said mandrel travelling in directions opposite the movement of said mandrel.

4. A machine as characterized comprising, a reciprocating mandrel; means for rotating the same in timed relation to the lengthwise movement thereof; a plurality of rotative members grouped about said mandrel in spaced relation therefrom for engaging, frictionally, a coiled ring mounted on said mandrel; and means for rotating said members to cause the peripheries of said members adjacent said mandrel to move in a direction, the opposite to that in which said mandrel is moved, to roll a coiled fiber ring thereon.

WINFRED N. LURCOTT.